Patented May 6, 1947

2,420,131

UNITED STATES PATENT OFFICE 2,420,131

PROCESS FOR CONVERTING NOPINENE TO MYRCENE

Leo A. Goldblatt and Samuel Palkin, Washington, D. C.; dedicated to the free use of the People in the territory of the United States No Drawing. Application December 12, 1940, Serial No. 369,836

4 Claims. (Cl. 260—677)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to us.

This invention relates to a method of treating beta-pinene or nopinene to produce a compound possessing multiple systems of double bonds for use in the manufacture of synthetic resins and rubber-like products.

In the manufacture of synthetic resins, such as those of the Diels-Alder type, and other useful products, compounds possessing multiple systems of double bonds are employed due to their high reactivity.

We have found that nopinene can be thermally isomerized to produce a product containing highly unsaturated open chain compounds possessing in part non-conjugated systems and in part conjugated systems of double bonds of various orders, one such compound being myrcene.

In general, the process we have discovered comprises vaporizing the nopinene or a turpentine fraction rich in nopinene, either by heat alone or by passage of a current of an inert gas, such as nitrogen, through the reactant. A suitable vaporization temperature is maintained and the vapors are directed through a heated zone maintained at a temperature of about 370° to 425° C., preferably 405° C. After passing through this heated zone, the reaction vapor product is promptly cooled causing it to condense to a liquid which is recovered.

As a specific example, a nopinene fraction of turpentine having typical characteristics of $a_D = -17.9°$, $d_4^{20} = 0.869$, $n_D^{25} = 1.476$ was heated to 160° C. and a current of nitrogen gas was passed through the heated liquid at the rate of about 600 cc. per minute. The mixed vapors were then passed through a preheater to raise the temperature of the vapor to about 300° C. and then immediately passed through a reaction tube maintained at about 405° C. The time required to traverse the reaction zone of high temperature was about five seconds. The heat-treated vapor was then promptly cooled and the liquid condensate collected in a receiver protected from contact with oxygen of the air. Such protection from contact with oxygen is preferred, but it is not indispensable. The characteristics of the product changed to $a_D = -11.3°$, $d_4^{20} = 0.805$, $n_D^{25} = 1.470$. Although oxygen is absorbed very slowly by the product just after it is recovered from the process, if left to stand in the atmosphere for several weeks, it will be found to have absorbed up to about 35% of its own weight of oxygen. The product was found to react extremely rapidly with compounds like maleic anhydride.

When nopinene is thermally isomerized, isomerization products other than myrcene are formed which in the production of resins from the whole reaction product, by the Diels-Alder type reaction, prevent crystallization of the resins produced.

In addition to the uses mentioned above, we have found that myrcene can be polymerized to rubber-like products by prolonged standing.

Having thus described our invention, we claim:

1. The method of producing a product containing as its essential active ingredient myrcene, the step comprising vaporizing nopinene, passing the vapor over a period of about 5 seconds through a reaction zone maintained at a temperature of about 370° to 425° C., and promptly cooling the reaction vapor to a liquid condensate.

2. The method of producing a product containing as its essential active ingredient myrcene, the step comprising vaporizing nopinene, bringing the vapor to a temperature of about 300° C., passing the vapor over a period of about 5 seconds through a reaction zone maintained at a temperature of about 370° C. to 425° C., and promptly cooling the reaction vapor to a liquid condensate.

3. The method of producing a product containing as its essential active ingredient myrcene, the step comprising vaporizing nopinene, heating the vapor a temperature of about 405° C. for about 5 seconds, and promptly cooling the reaction vapor to a liquid condensate.

4. The process for manufacturing myrcene comprising thermally isomerizing nopinene in a vapor phase at a temperature of about 370° to 425° C. for about 5 seconds.

LEO A. GOLDBLATT.
SAMUEL PALKIN.

REFERENCES CITED

The following references are of record in the file of this patent:

UNITED STATES PATENTS

| Number | Name | Date |
|---|---|---|
| 1,996,558 | Ulffers | Apr. 2, 1935 |
| 1,095,395 | Heinemann | May 5, 1941 |
| 1,057,680 | Stephan | Apr. 1, 1931 |

OTHER REFERENCES

J. Gen. Chem. (Russ) 1, pages 502–505 (1931).
Heusler, Chemistry of the Terpenes, Trans. by Bond (1902), pages 377–378. (Copy in Division 6.)